US012615259B2

(12) United States Patent
Kemp et al.

(10) Patent No.: US 12,615,259 B2
(45) Date of Patent: Apr. 28, 2026

(54) CONTROLLING ACCESS TO NETWORK RESOURCES USING ADAPTIVE ALLOW LISTS

(71) Applicant: Dell Products, L.P., Round Rock, TX (US)

(72) Inventors: Walter Kemp, Georgetown, TX (US); Kearson M. McNulty, Austin, TX (US); Harpreet Narula, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 233 days.

(21) Appl. No.: 18/452,848

(22) Filed: Aug. 21, 2023

(65) Prior Publication Data

US 2025/0071115 A1      Feb. 27, 2025

(51) Int. Cl.
*H04L 9/40*           (2022.01)

(52) U.S. Cl.
CPC .......... *H04L 63/101* (2013.01); *H04L 63/108* (2013.01)

(58) Field of Classification Search
CPC ............................ H04L 63/101; H04L 63/108
See application file for complete search history.

(56) References Cited

U.S. PATENT DOCUMENTS

| | | | | |
|---|---|---|---|---|
| 6,202,156 B1 * | 3/2001 | Kalajan | ............... | H04L 63/0236 |
| | | | | 709/225 |
| 6,476,833 B1 * | 11/2002 | Moshfeghi | .......... | G06F 16/9535 |
| | | | | 715/854 |
| 7,748,047 B2 * | 6/2010 | O'Neill | ............... | H04L 63/0876 |
| | | | | 726/1 |
| 7,930,413 B2 * | 4/2011 | Peddemors | ........... | H04L 63/101 |
| | | | | 709/227 |
| 2008/0090614 A1 * | 4/2008 | Sicher | ................... | H04W 8/205 |
| | | | | 455/414.1 |
| 2020/0162919 A1 * | 5/2020 | Velev | .................... | H04W 60/00 |

* cited by examiner

*Primary Examiner* — Yonas A Bayou
(74) *Attorney, Agent, or Firm* — Fogarty LLP

(57)                ABSTRACT

Systems and methods provide Information Handling Systems (IHSs) that are restricted to communications with a plurality of allowed network resources. An IHS detects a request for access to a network resource. Upon detecting the request, the IHS identifies a factory-provisioned network address that is stored by the IHS and that specifies a location of an adaptive allow list that specifies a listing of the allowed network resources to which the IHS is restricted. The adaptive allow list is loaded from the factory-provisioned network address and used to reject the request for access to the network resource when the network resource is not in the listing of allowed network resources from the adaptive allow list. Through modifications to the adaptive allow lists, administrators can modify the network resource that may be accessed by the IHS.

17 Claims, 4 Drawing Sheets

205 — AGREEMENT FOR MANUFACTURE AND/OR PROVISIONING OF IHS ACCORDING TO CUSTOMER REQUIREMENTS

210 — CUSTOMER PROVIDES NETWORK LOCATIONS OF ONE OR MORE ADAPTIVE ALLOW LISTS

215 — IHS IS MANUFACTURED ACCORDING TO CUSTOMER REQUIREMENTS

220 — IHS IS FACTORY PROVISIONED WITH NETWORK LOCATION OF CUSTOMER-PROVIDED ADAPTIVE ALLOW LIST

225 — IHS IS DELIVERED

230 — IHS IS INITIALIZED FOR THE FIRST TIME

235 — BOOT CODE DETERMINES IHS IS CONFIGURED FOR USE OF ADAPTIVE ALLOW LISTS FOR ACTIVATION OF IHS

240 — BOOT CODE RETRIEVES CUSTOMER-PROVIDED ADAPTIVE ALLOW LIST USING FACTORY PROVISIONED NETWORK LOCATION

245 — NETWORK INTERFACES OF IHS RESTRICTED TO NETWORK RESOURCES IDENTIFIED IN THE ADAPTIVE ALLOW LIST

250 — BOOTING AND ACTIVATION OF IHS RESUMES

200

100

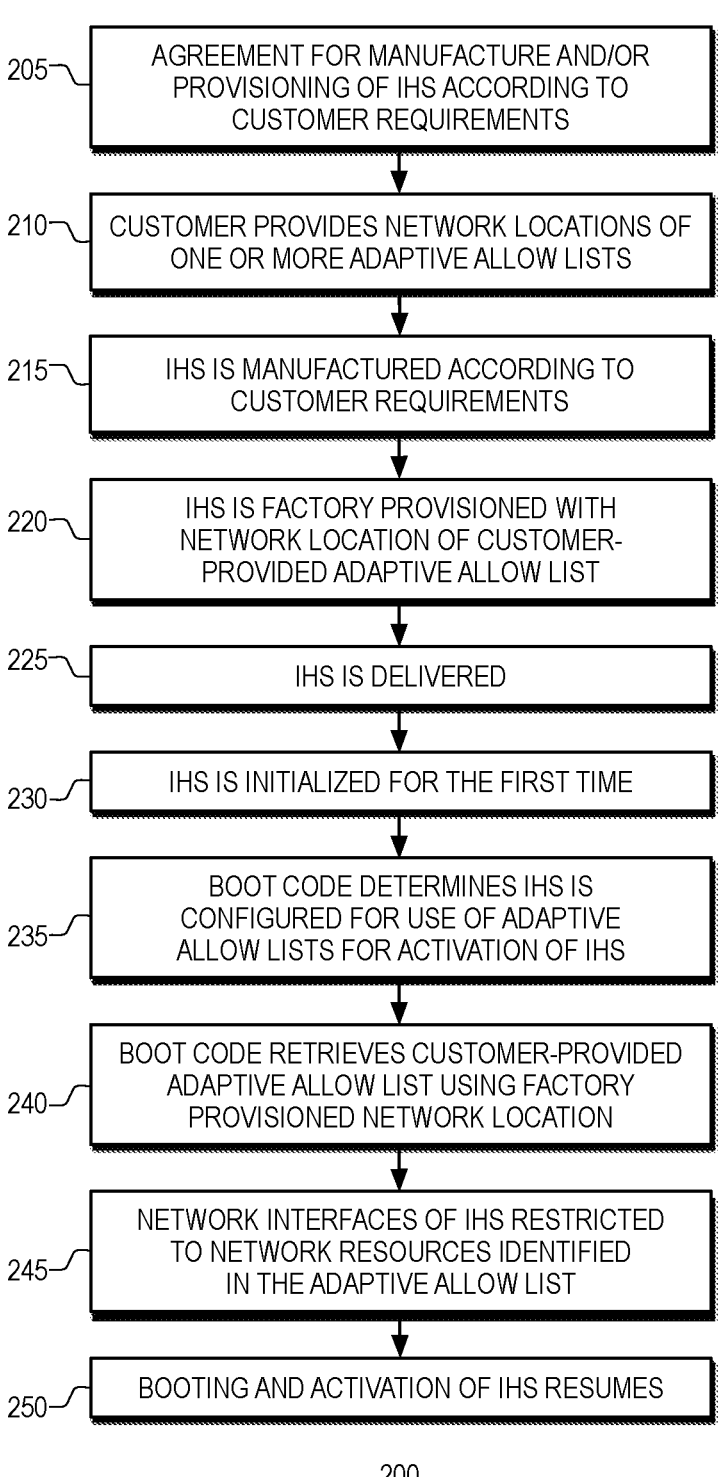

205 — AGREEMENT FOR MANUFACTURE AND/OR PROVISIONING OF IHS ACCORDING TO CUSTOMER REQUIREMENTS

210 — CUSTOMER PROVIDES NETWORK LOCATIONS OF ONE OR MORE ADAPTIVE ALLOW LISTS

215 — IHS IS MANUFACTURED ACCORDING TO CUSTOMER REQUIREMENTS

220 — IHS IS FACTORY PROVISIONED WITH NETWORK LOCATION OF CUSTOMER-PROVIDED ADAPTIVE ALLOW LIST

225 — IHS IS DELIVERED

230 — IHS IS INITIALIZED FOR THE FIRST TIME

235 — BOOT CODE DETERMINES IHS IS CONFIGURED FOR USE OF ADAPTIVE ALLOW LISTS FOR ACTIVATION OF IHS

240 — BOOT CODE RETRIEVES CUSTOMER-PROVIDED ADAPTIVE ALLOW LIST USING FACTORY PROVISIONED NETWORK LOCATION

245 — NETWORK INTERFACES OF IHS RESTRICTED TO NETWORK RESOURCES IDENTIFIED IN THE ADAPTIVE ALLOW LIST

250 — BOOTING AND ACTIVATION OF IHS RESUMES

305 — IHS IN OPERATION

310 — NETWORK ACCESS VIA A NETWORK INTERFACE OF THE IHS IS REQUESTED

315 — ADAPTIVE ALLOW LIST(S) THAT RESTRICT THE NETWORK INTERFACE ARE IDENTIFIED

320 — ADAPTIVE ALLOW LIST(S) ARE LOADED

CONTROLLING ACCESS TO NETWORK RESOURCES USING ADAPTIVE ALLOW LISTS

FIELD

This disclosure relates generally to Information Handling Systems (IHSs), and more specifically, to managing and controlling access to network resources by IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Organizations may manage large numbers of IHSs. For instance, corporations and other organizations may issue an IHS to each employee. A school or other educational institution may issue an IHS to students and faculty. Administrators in charge of certain groups of such IHSs are frequently tasked with configuring each individual IHS with restrictive permission systems that restrict users from accessing certain external resources, such as from accessing certain websites or networks. Existing administrative approaches use ACLs (Access Control Lists) that specify resource operations that are allowed to individual users. Such mechanisms are cumbersome to administer for large numbers of users and are not practical for use in controlling access to external resources, such as websites. Existing administrative approaches also include allow/deny lists that specify resources that are available to a user, such as a list of websites that student users are blocked from accessing, or a list of websites that the student user is restricted to accessing. Such lists tend to be cumbersome to administer such that initial configurations are not modified or insufficiently modified, despite apparent shortcomings, or restrictions are removed and users are allowed unrestricted access to network resources.

SUMMARY

In various systems and methods, Information Handling System (IHSs) are restricted to communications with a plurality of allowed network resources. The IHSs may include: one or more processors; a memory device coupled to the one or more processors, the memory device storing computer-readable instructions that, upon execution by the one or more processors, cause the IHS to: detect a request for access to a network resource; identify a factory-provisioned network address that is stored by the IHS and that specifies a location of an adaptive allow list comprising a listing of the allowed network resources to which the IHS is restricted; load the adaptive allow list from the factory-provisioned network address; and reject the request for access to the network resource when the network resource is not in the listing of allowed network resources from the adaptive allow list.

In some embodiments, the factory-provisioned network address specifying the location of the adaptive allow list is provided by a customer for which the IHS is being factory-provisioned. In some embodiments, modifications to the adaptive allow list by the customer modify the allowed network resources to which the IHS is restricted. In some embodiments, the adaptive allow list further comprises a link to an additional adaptive allow list comprising a listing of additional allowed network resources to which the IHS is restricted. In some embodiments, execution of the instructions by the one or more processors further causes the IHS to: determine whether the additional adaptive allow list is stored in a local cache of the IHS, wherein the local cache stores one or more adaptive allow lists. In some embodiments, execution of the instructions by the one or more processors further causes the IHS to: remove an expired adaptive allow list from the local cache of the IHS, wherein the removal of the expired adaptive allow list results in rejection of request to access network resources listed in the expired adaptive allowed list. In some embodiments, the allowed network resources from the adaptive allowed list comprise a set of Internet domains to which the IHS is restricted. In some embodiments, the additional allowed network resources from the additional adaptive allowed list comprises a network address of a peripheral device. In some embodiments, the peripheral device comprises a multimedia device. In some embodiments, expiration of the additional adaptive allowed list restricts further access to the multimedia device by the IHS. In some embodiments, execution of the instructions by the one or more processors further causes the IHS to: reject all request for access to network resources in response to determining the loaded adaptive allow list is empty. In some embodiments, the adaptive allow list is emptied based on a command from an administrator configuring access to network resource by the IHS. In some embodiments, modifications to the adaptive allow list by the customer modify the allowed network resources to which a group of IHS are restricted, where each IHS in the group is factory-provisioned with the network address of the adaptive allow list.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 2 is a flow chart diagram illustrating certain steps of a process according to various embodiments for supporting adaptive allow lists.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
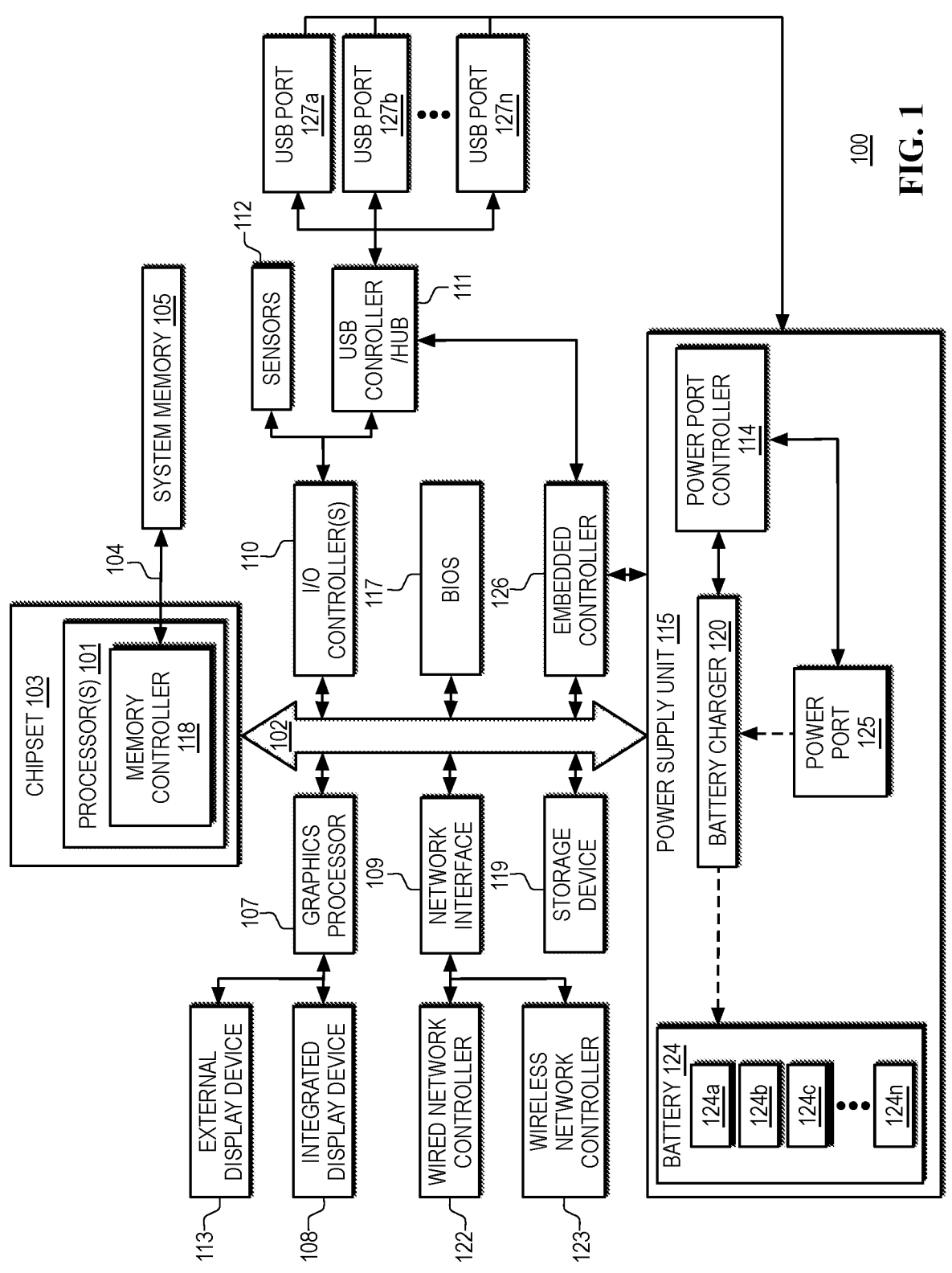
FIG. 1 is a block diagram depicting certain components of an IHS operable according to various embodiments for supporting adaptive allow lists.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

FIG. 1 is a block diagram depicting certain components of an IHS 100 operable according to various embodiments for supporting adaptive allow lists. As described in additional detail below, IHS 100 may include capabilities for managing and using adapting allow lists that control access to resources that are external from IHS 100, and in particular to resources that are accessible via a network. As described, an IHS may operate using a variety of network resources that may include both hardware and software systems. For instance, an IHS may access a network resource in the form of a remote website in order to participate in an online collaborative session, or in order to access a remote web service hosting financial information. In another example, an IHS 100 used in a medical facility, such as portable IHSs used by staff, patients and guests, may access a variety of network resources that may include websites and service, and may also access other devices operating within that medical facility, such as display monitors, medical monitoring and testing equipment, devices for controlling entry to certain areas of a facility, environmental control systems, etc. In another example, an IHS 100 in a home setting may access network resources that include websites and services, as well as access networked devices used in gaming, multimedia, home monitoring, etc.

In embodiments, IHS 100 may be configured to access these network resources based on adaptive allow lists that specify network resource that IHS 100 has been authorized to access. As described in additional detail below, IHS 100 may be configured to restrict use of networking capabilities of the IHS based on authorizations set forth in adaptive allow lists that control access to network resources that are available to IHS 100. In some embodiments, IHS 100 may be configured to prevent access to any network resources other than those authorized via entries in an adaptive allow list that is used by a network interface 109 of the IHS 100. As described in additional detail below, IHS 100 may be factory provisioned with the location of an adaptive allow list that specifies the locations of network resources that may be accessed by network interface 109, with access to all other network locations being prohibited by the network interface 109 of IHS 100. Also as described in additional detail below, modifications to this adaptive allow list that controls the operation of network interface 109 result in modifications to the network resources that may be accessed by IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connected to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by applications of the operating system of IHS 100.

In embodiments, network interface 109 may be instrumented to restrict access to network resources that are specified in an adaptive allow list, where the location of this adaptive allow list may be stored to a secure data storage location of IHS 100 as part of its factory provisioning. Once IHS 100 has been delivered and is in operation by a user, each initialization of IHS 100 may trigger embodiments to identify this factory provisioned location of the adaptive allow list that has been designated for use by this particular IHS 100 in controlling the network resources that are accessible by IHS 100. In such embodiments, all network interfaces 109 of IHS 100 may be configured to identify the location of the operative adaptive allow list upon initialization of the IHS, the network interface and/or upon receipt of a request for access to a network resource.

For instance, a NIC, whether supporting wired or wireless network connections, may be factory provisioned to locate an operative adaptive allow list each time the NIC is initialized. In such instances, the location of the adaptive allow list may be specified in a secured data storage location of the IHS 100, such as a part of boot instructions utilized by CPU 101, or in boot instructions utilized by embedded controller 126. In some embodiments, the NIC may retrieve the location of the adaptive allow list from a secured memory of embedded controller 126, such as in response to the NIC receiving a request for access to a network resource. In this same manner, the other network interfaces 109 of IHS 100, such as Bluetooth, Wi-Fi and cellular network interfaces, may be configured to restrict access by IHS 100 to only network resources that are identified in a factory-provisioned adaptive allow list.

As described in additional detail below, adaptive allow lists may be tiered, such as through an adaptive allow list including a link to another adaptive allow list. Such links included in an adaptive allow list may provide a URL to the location of another adaptive allow list, thus allowing a single adaptive allow list to include multiple levels of nested adaptive allow lists. For instance, a factory-provisioned adaptive allow list may specify a core set of network resources that are authorized for use by an IHS. This core adaptive allow list may include a link to a more specific adaptive allow list that specifies the networked hardware devices, such as a set of gaming and multimedia devices, that IHS 100 is allowed to access. As described in additional detail below, as part of factory provisioning of IHS 100 for a particular customer, that customer can provide the locations of one or more adaptive allow lists that will be used to specify resources that are authorized for use by that IHS 100. Once the IHS 100 has been delivered and is in use, the customer may modify the network resources that may be accessed by the network interfaces 109 of IHS 100 through modifications to these adaptive allow lists, thus restricting or augmenting the network resources that may be accessed by the user of the IHS 100.

In additional capabilities of IHS 100, chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device. In some embodiments, IHS 100 may be a hybrid laptop computer that includes dual integrated displays incorporated in both of the laptop panels. IHS 100 may also support use of one or more external displays 113, such as external monitors that may be coupled to IHS 100 via various types of couplings In certain embodiments, chipset 103 may utilize one or more I/O controllers 110 that may each support hardware components such as user I/O devices and sensors 112. For instance, I/O controller 110 may provide access to one or more user I/O devices such as a keyboard, mouse, touchpad, touchscreen, microphone, speakers, camera and other input and output devices that may be coupled to IHS 100. Each of the supported user I/O devices may interface with the I/O controller 110 through wired or wireless connections. In certain embodiments, sensors 112 that may be accessed via I/O controllers 110 may provide access to data describing environmental and operating conditions of IHS 100. For instance, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100.

As illustrated, I/O controllers 110 may include a USB controller 111 that, in some embodiments, may also implement functions of a USB hub. In some embodiments, USB controller 111 may be a dedicated microcontroller that is coupled to the motherboard of IHS 100. In other embodiments, USB controller 111 may be implemented as a function of another component, such as a component of a SoC (System on Chip) of IHS 100, embedded controller 126, processors 101 or of an operating system of IHS 100. USB controller 111 supports communications between IHS 100 and one or more USB devices coupled to IHS 100, whether the USB devices may be coupled to IHS 100 via wired or wireless connections. In some embodiments, a USB controller 111 may operate one or more USB drivers that detect the coupling of USB devices and/or power inputs to USB ports 127*a-n*. USB controller 111 may include drivers that implement functions for supporting communications between IHS 100 and coupled USB devices, where the USB drivers may support communications according to various USB protocols (e.g., USB 2.0, USB 3.0). In providing functions of a hub, USB controller 111 may support concurrent couplings by multiple USB devices via one or more USB ports 127*a-n* supported by IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. In some embodiments, BIOS 117 may be implemented using a dedicated microcontroller coupled to the motherboard of IHS 100. In some embodiments, BIOS 117 may be implemented as operations of embedded controller 126. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Some IHS 100 embodiments may utilize an embedded controller 126 that may be a motherboard component of IHS 100 and may include one or more logic units. In certain embodiments, embedded controller 126 may operate from a separate power plane from the main processors 101, and thus from the operating system functions of IHS 100. In some embodiments, firmware instructions utilized by embedded controller 126 may be used to operate a secure execution environment that may include operations for providing various core functions of IHS 100, such as power management and management of certain operating modes of IHS 100.

Embedded controller 126 may also implement operations for interfacing with a power supply unit 115 in managing power for IHS 100. In certain instances, the operations of embedded controller may determine the power status of IHS 100, such as whether IHS 100 is operating strictly from battery power, whether any charging inputs are being received by power supply unit 115, and/or the appropriate mode for charging the one or more battery cells 124a-n using the available charging inputs. Embedded controller 126 may support routing and use of power inputs received via a USB port 127a-n and/or via a power port 125 supported by the power supply unit 115. In addition, operations of embedded controller 126 may interoperate with power supply unit 115 in order to provide battery status information, such as the charge level of the cells 124a-n of battery 124. In some embodiments, embedded controller 126 may also interface with power supply unit 115 in monitoring the battery state of battery 124, such as the relative state of charge of battery 124, where this charge level of the battery 124 may be specified as a percentage of the full charge capacity of the battery 124.

Embedded controller 126 may also implement operations for detecting certain changes to the physical configuration of IHS 100 and managing the modes corresponding to different physical configurations of IHS 100. For instance, where IHS 100 is a laptop computer or a convertible laptop computer, embedded controller 126 may receive inputs from a lid position sensor that may detect whether the two sides of the laptop have been latched together, such that the IHS is in a closed position. In response to lid position sensor detecting latching of the lid of IHS 100, embedded controller 126 may initiate operations for shutting down IHS 100 or placing IHS 100 in a low-power mode. In this manner, IHS 100 may support the use of various power modes. In some embodiments, the power modes of IHS 100 may be implemented through operations of the embedded controller 126 and power supply unit 115.

As described above, embedded controller 126 may be factory provisioned to support the use of adaptive allow list by IHS 100. For instance, factory provisioning of IHS 100 may store one or more adaptive allow list locations to secure data storage locations maintained by embedded controller 126, such as an onboard NVRAM. In such embodiments, the location of the stored adaptive allow list locations may be encoded within the boot code of IHS 100. As described in additional detail below, upon booting of IHS 100, the boot code may determine the network resources accessible by IHS 100 are restricted by adaptive allow lists, which are then retrieved using the location information stored by embedded controller 126. Also as described in additional detail below, administrators tasked with configuring IHSs that utilize adaptive allow lists may be provided with capabilities for shutting down all access to network resources by these IHSs and/or for allowing all network access by these IHSs. In such embodiments, embedded controller 126 may be configured to receive such commands from an administrative interface and to respond by immediately reconfiguring the adaptive allow lists used by each of the network interfaces 109.

As described, IHS 100 may also include a power supply unit 115 that receives power inputs used for charging batteries 124 from which the IHS 100 operates. IHS 100 may include a power port 125 to which an AC adapter may be coupled to provide IHS 100 with a supply of DC power. The DC power input received at power port 125 may be utilized by a battery charger 120 for recharging one or more internal batteries 124 of IHS 100. As illustrated, batteries 124 utilized by IHS 100 may include one or more cells 124a-n that may connected in series or in parallel. Power supply unit 115 may support various modes for charging the cells 124a-n of battery 124 based on the power supply available to IHS 100 and based on the charge levels of the battery system 124. In certain embodiments, power supply unit 115 of IHS 100 may include a power port controller 114 that is operable for configuring operations by power port 125.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

FIG. 2 is a flow chart diagram illustrating certain steps of a process according to various embodiments for supporting adaptive allow lists. In some embodiments, an IHS may be factory provisioned to restrict the network communications of the IHS to accessing network resources specified in an adaptive allowed list, where the customer for which the IHS is being provisioned may provide the network location of this adaptive allowed list. Provisioned in this manner, an IHS may be restricted to network communications only with resources specified by the customer in the adaptive allowed list, where the customer maintains control of this adaptive allow list. Through modifications to the adaptive allowed list, the customer may change the network resources that the IHS is allowed to access. In some adaptive allow list configuration, modifications to adaptive allow list may serve to reconfigure the network permissions of large numbers of IHSs that operate using these adaptive allow lists. In this manner, the customer may restrict the network resources that may be accessed by users of the IHS, such as in certain educational or corporate settings where users are issued IHSs that are restricted to use of certain network resources.

As illustrated, embodiments may begin at block 205 with an agreement to manufacture and/or factory provision an IHS according to customer requirements, such as the IHS described with regard to FIG. 1. In some instances, a customer may contract for manufacture and provisioning of an IHS according to hardware and software specifications agreed upon by the customer and manufacturer of the IHS. For instance, a customer may request manufacture of a significant quantity of IHSs that are to be identically configured and issued to users, such as an educational institution requesting manufacture of IHSs for issuance to students, or such corporations or other organizations requesting manufacture of IHSs for issuance to employees. As described, in certain of such instances, the customer may request that these IHSs be restricted to supporting only certain network communications. Such restrictions may be specified by customers as part of the agreement for manufacture and provisioning of a group of IHSs. Also as described, embodiments support capabilities for an individual to use such capabilities to instead support temporary access to particular network resources, such as granting a guest with temporary access to a multimedia and/or gaming device. As such, through manufacture and provisioning of an IHS for a customer in a manner that supports the use of adaptive allow lists, the customer retains the ability to configure network resource restrictions themselves, where the configurations may operate in a permissive or in a restrictive manner, such that permissive configurations may allow the IHS to gain temporary access to networked peripheral devices or other network resources, and restrictive permission limit access to only a specified set of network resources.

As part of the agreement to manufacture and provision an IHS, at 210, embodiments may continue with the customer providing one or more network locations at which adaptive allow lists are stored, or will be stored. The storage location for these adaptive allow lists may be any networked location, such as specified via a URL or network address, at which the customer can store and modify the adaptive allow lists that are stored there, such as a private server or a cloud hosted storage location. As such, the level of security desired by the customer in controlling the ability to modify these adaptive allow list is determined by the customer's security protocols used to protect these adaptive allow list. Moreover, the customer need not rely on the manufacturer of the IHS or any other entity in order to modify and protect the stored locations of these adaptive allow lists.

In a scenario where the customer is an educational institution that is contracting for manufacture and provisioning of IHSs for use by students, the educational institution may maintain a network storage location at which adaptive allow lists are stored and retrieved for use in controlling the network resources that are available to these IHSs. A company or other organization may similarly maintain a network storage location for use in configuring and controlling network resources that are available to IHSs issued to employees. An individual requesting configuration of an IHS for use of adaptive allow lists may similarly provide a network location at which adaptive allow lists may be stored and used to grant the individual with access to network resources.

Based on specifications provided by the customer, at 215, the IHS is manufactured according to the customer's requirements. In some instances, an IHS may be manufactured using a factory process that includes multiple phases of assembly, validation and provisioning that must be completed before the IHS is supplied to a customer. An IHS may be purpose-built for a particular customer such that the IHS is assembled and provisioned according to specifications provided by the customer. The initial factory assembly of an IHS may include the selection of a chassis and the fastening of various hardware components to the selected chassis. In various scenarios, the installed hardware components may include standard components and may also include specialized components that have been requested by a specific customer that has contracted for the assembly and delivery of an IHS. Once the physical assembly of an IHS has been completed, the IHS may be subjected to manual and automated inspections that confirm the IHS has been properly assembled and does not include any defects.

After confirming an IHS has been assembled without any manufacturing defects, at block 220, factory provisioning of the IHS may be initiated. In some instances, the provisioning of an IHS at the factory may include various stages that may include stages for loading of firmware, configuring hardware components, and installing an operating system and other software. In addition, embodiments may store the customer-supplied location of the adaptive allow lists that will be used to specify the network resources that will be available to the IHS. In some instances, this location of the adaptive allow lists may be stored in a secure data storage of the IHS, where this data storage location is accessible to the boot code of the IHS. For instance, embodiments may store the location of the adaptive allow lists to a BIOS/UEFI 117 entry that is accessed during booting of the IHS. In another illustrative example, the location of the adaptive allow lists may be stored to a secure data storage of embedded controller 126 that is accessible to the boot code of the IHS. In another illustrative example, the location of the adaptive allow lists may be loaded to a storage device 119 of the IHS.

Once provisioning of the IHS is complete, at 225, the IHS is delivered to the customer, or in some instances, to a destination specified by the customer, such as to the location of the user that will operate the IHS. In some embodiments, the adaptive allow lists that have been factory provisioned to the IHS are used to control the network resources that are accessible to the IHS during its initial activation. Such capabilities serve to restrict the IHS to accessing only network resources specified in the adaptive allow lists during the activation and initial configuration of the IHS, thus reducing the possibility of the IHS being misconfigured and of the IHS being compromised during this activation and configuration phase.

At some point after the IHS has been delivered, at 230, the IHS is initialized for the first time. In some instances, the IHS may be initialized by an individual that is the customer that has contracted for manufacture and provisioning of the IHS. In other instances, the IHS may be initialized by an administrator that received the IHS and prepares it for deployment. For instance, in an educational or corporate setting, IHSs may be received by administrators that are tasked with receiving and preparing the IHSs for delivery to users, where such administration may include the installation of various software programs, making various software and hardware configurations, and/or installation of hardware components. Whether received by an administrator or by an individual user, embodiments support capabilities for restricting the external resources that are accessible by the IHS during this initial configuration of the IHS. When configured in this manner, embodiments strictly restrict the network resources that are accessible by an IHS to those specified in the factory provisioned adaptive allow list, where such restrictions remain in place until the initial activation and configuration of the IHS has been completed.

During the initial booting of the IHS upon its delivery, at 235, the boot code determines the IHS has been configured for operation using adaptive allow lists during this initial configuration of the IHS. At 240, embodiments identify the stored location of the factory provisioned network location of the adaptive allow lists that specify the network resources that are allowed for use. As described, this factory provisioned network location, such as one or more IP addresses, may be provided by a customer as part of the agreement to manufacture and provision the IHS for that particular customer. In some instances, the adaptive allow list that will be used during product activation may be augmented by the manufacturer with network addresses of resources used to initialize the IHS, such as to register the IHS and certain of its components (e.g., registration of the operating system). The boot code retrieves this customer provided network location from the secured data storage of the IHS to which this information was encoded during factory provisioning of the IHS.

Using the network location retrieved by the boot code, embodiments retrieve the one or more adaptive allow lists that are stored at the location. For instance, the network location may be an IP address that corresponds to a web service that returns one or more adaptive allow lists upon being invoked, where various forms of authentication may be used in confirming the authenticity of the request for the adaptive allow lists. Upon retrieval of the adaptive allow list, embodiments may iterate through the list in converting various types of supported network location information to network addresses and configurations for use in restricting the network communications of the IHS to only the network locations specified in the adaptive allow list.

Based on the network addresses specified in the retrieved adaptive allow lists, at 245, embodiment may perform various configurations of the network interfaces supported by the IHS. As described with regard to IHS 100 of FIG. 1, various distinct network controllers may be supported by an IHS, each supporting communications between the IHS and a variety of network resources. In some embodiments, the configuration of the network interfaces of the IHS includes configuring a NIC to support outbound network connections to only a specific set of network addresses, such as one or more IP addresses. In a similar manner, embodiments may also configure a Bluetooth controller to limit outgoing connections to only a specific set of network or other addresses corresponding to peripheral devices that are authorized for use by the IHS. With the network interfaces of the IHS configured in this manner using the adaptive allow lists, at 250, embodiments continue booting of the IHS and activation of the IHS resumes.

Using the allowed set of network resources from the adaptive allow lists, various procedures for configuring the IHS may proceed as part of its initialization. For instance, embodiments may utilize network locations from the adaptive allow lists in the registration and activation of the IHS, and of software and hardware operating on the IHS. Embodiments may also utilize the network locations from the adaptive allow lists in retrieving and installing various software programs to the IHS, such as installing and/or updating security software on the IHS. In this manner, security software may be installed or updated (e.g., retrieval of the most recent antivirus or other threat libraries), without exposing the IHS to potentially malicious network communications.

Figure 3A:
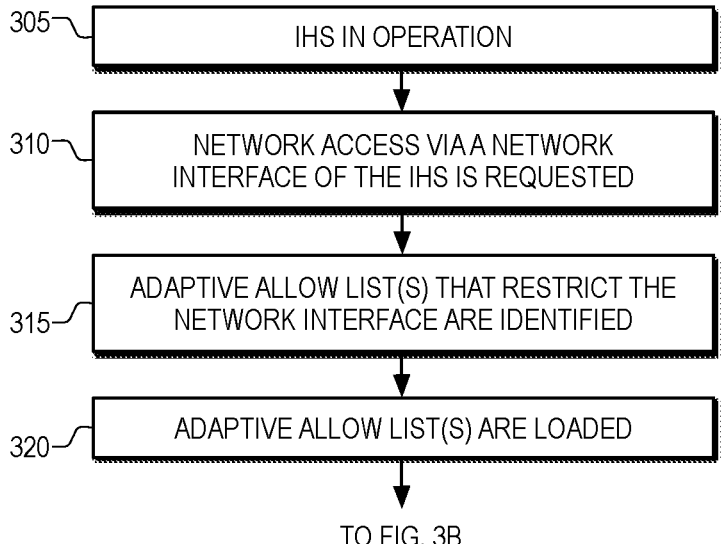
FIG. 3A is a flow chart diagram illustrating certain steps of a process according to various embodiments for supporting adaptive allow lists.
Figure 3B:
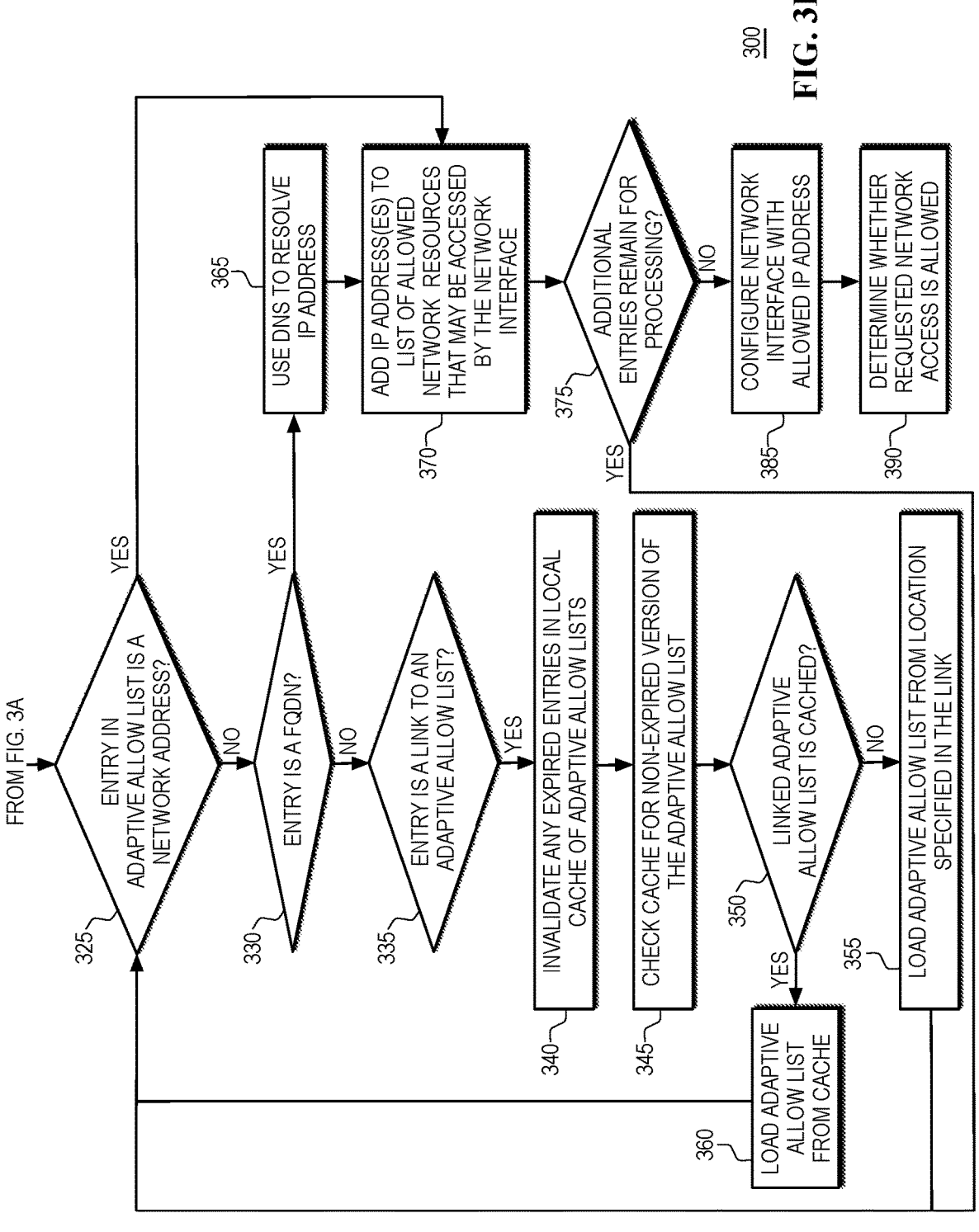
FIG. 3B is a flow chart diagram that is a continuation of FIG. 3A.

FIGS. 3A and 3B are a flow chart diagram illustrating certain steps of a process according to various embodiments for supporting use of adaptive allow lists. In continuation of the embodiment of FIG. 2, the embodiment of FIGS. 3A and 3B may begin at block 305 with an IHS, such as the IHS described with regard to FIG. 1, in operation after the IHS has been determined to be configured for use of adaptive allow lists. With the IHS in operation, at 310, embodiments detect a request for access to a network resource. In some instances, such requests may result directly from user inputs, such as a user selecting a link displayed via a web browser or in initiating certain applications. In other instances, such requests may result automatically from software programs operating on the IHS, such as software programs initiating contact with web-based services (e.g., polling for updates to an email client). In some instances, such requests may result from manual or automatic requests to connect to a networked peripheral devices, such as a request to connect to an available multimedia and/or gaming device (e.g., request for access to a networked display monitor, speaker or game controller).

Upon detecting a request for access to a network resources, at 315, embodiments identify the one or more operative adaptive allow lists. As described above, the network location of adaptive allow lists that restrict network resources available to the IHS may be stored to the IHS as part of its factory provisioning. In some embodiments, an adaptive allow list specifying a set of core network resources may be stored to the IHS as part of the factory provisioning. For instance, in an educational setting, an adaptive allow list specifying core network resources available to the IHS may identify a base set of resources made available to all students, such as resources provided by the educational institution (e.g., school web sites), resource provided by parties contracted by the educational institution (e.g., web sites of testing services and online collaboration platforms), and other approved web sites. Embodiments may identify one or more operative adaptive allow lists based on network locations stored by the IHS, where such network locations may be stored to the IHS through factory provisioning, or through later configuration of the IHS, such as part of its initial configuration by an administrator.

Based on this network location information, at 320, embodiments retrieve one or more operative adaptive allow lists. As described above, the stored network location information may be IP addresses of web-based services that authenticate requests by the IHS and return one or more adaptive allow lists that have been designated for use by the IHS in controlling the network resources that are available to the IHS. Once the operative adaptive allow lists have been retrieved, embodiments may begin iterating through each of the entries in each of the returned adaptive allow lists. As part of these iterations, at 325, embodiments determine if an entry in the adaptive allow list is a network address that is directly usable, such as an IP address or range of IP addresses. In scenarios where the entry is such a network address, at 370, the address is added to the list of network resources that may be accessed by the IHS. At 375, embodiments determine whether additional entries remain for processing in the one or more adaptive allow lists. If additional entries remain, processing returns, at 325, to processing the subsequent entry.

In scenarios where an entry is not a network address, such as an IP address, at 330, embodiments determine whether an entry specifies an Internet domain, such a FQDN (Fully Qualified Domain Name), that is resolvable to a network address, or range of addresses. In instances where the entry is an Internet domain, at 365, a DNS (Domain Name System) server is queried for network addresses that are associated with that domain. Once the domain information from the entry has been resolved to an IP address, or another network address, at 370, embodiments add these addresses to the list of allowed network resources. If additional entries remain, at 325, embodiments continue processing of these entries.

In scenarios where an entry is not a network address or an Internet domain, at 335, embodiments determine whether the entry is a link to another adaptive allow list. As described above, embodiments may support tiered adaptive allow lists through such entries that are links to other adaptive allow lists. Through the use of nested adaptive allow lists, embodiments provide further support for the adaptation of the network resources that are allowed for use by an IHS. In some embodiments, the adaptive allow lists loaded during booting of an IHS may specify a core set of resources that are available by default to the IHS, such as a default set of capabilities granted to all users that receive an IHS configured for the customer. From time to time, the customer may choose to augment the network resources that are allowed for use by an IHS. In some instances, such expansions of the allowed network resources may be configured through the use of nested adaptive allow lists.

Through modifications to these nested adaptive allow lists, a customer may authorize connections with additional network resources by an IHS. For instance, a nested adaptive allow list may be used to specify additional network resources that are being added for use by the IHS, such as adding to the web sites that the IHS is authorized to access. In an educational setting, a nested adaptive allow list may be used to add authorized web sites that are being added in providing access to online resources for a class in which the user of the IHS is enrolled. Through modifications to this nested adaptive allow list, an administrator may modify these network resources in order to add or remove web sites from those that are authorized. In this manner, embodiments provide administrators with a mechanism for easily modifying the network resources that may be accessed by all users of IHSs, or by subgroups of these users.

The network resources that may be added via use of a nested adaptive allow list may also include peripheral devices, or other hardware components, that are accessed via a network. For instance, in a home setting, a variety of multimedia devices may be accessed via a Wi-Fi network available within the home. In one illustrative example, a home network may provide access to speakers, display monitors, televisions, certain appliances, game controllers and consoles, etc. Embodiments support granting a user of an IHS with access to such peripheral devices through the use of nested adaptive allow lists. For example, a user that is a guest in a home may be granted access to use of some or all of the available networked multimedia devices through a nested adaptive allow list that has been modified to include the network addresses of the specific devices that have been authorized for use.

In some embodiments, each individual nested adaptive allow list may be associated with an expiration that limits the duration for which access has been authorized. For instance, each adaptive allow list may have an associated expiration, such as a TTL (time-to-live) value, that provides a duration for which the adaptive allow list is valid. In some embodiments, an administrator may specify a expiration for an adaptive allow list, whether the adaptive allow list is newly created or is an existing adaptive allow list that is being modified. For instance, in an educational setting, an administrator configuring an adaptive allow list that specifies network resources for use in a particular class may specify an expiration for the adaptive allow list that is commensurate with the duration of the class. In this same manner, an administrator may specify expirations for adaptive allow lists in order to temporarily grant a user of an IHS with access to network resources. For example, in a scenario where a user is a guest in a setting that includes networked peripheral devices, a nested adaptive allow list with an expiration may be used to provide the guest user with temporary use of these peripheral devices. For instance, the addition of an entry in an adaptive allow list of the guest user may grant the user access to a gaming controller and display monitor, where this adaptive allow list may be configured with a six hour expiration that is commensurate with the duration of the guest's stay.

In some scenarios, groups of IHSs that are co-located may be organized into an edge layer or cluster within which IHSs may share access to certain resources, such as a game controller or display monitor that is available for use by multiple individuals, each individual using their own IHS. For instance, a game controller or display monitor that is within a home may be used by members of the household, and also by authorized guests of the household. In some embodiments, the IHSs and such shareable resources that are organized into an edge layer may share computing capabilities with other IHSs that are members of the edge layer. For instance, an IHS such as a laptop or tablet that is a member of such an edge layer of IHSs may be configured to share a certain amount of computing resources (e.g., processor cycles) with other members of the edge layer, thus supporting improved multimedia capabilities, such as reduced latency during gaming and virtual reality sessions conducted using IHSs or other shareable hardware resources that are members of the edge layer.

In some instances, certain software applications may be shared within edge layer of co-located IHSs. For example, a video game or other multimedia application may be accessed by all members of the co-located edge layer of IHSs. In some instances, operations of the edge layer may support transfer of software sessions between IHSs, thus allowing an ongoing gaming session to be transferred between IHSs that are members of the edge layer, such as from a tablet to a gaming console. In some instances, an ongoing gaming session may be transferred not only between IHSs, but also between users, thus allowing one individual to take over the ongoing game play of another individual.

In embodiments, adaptive allow lists may be utilized to manage such sharable resources that are available within a co-located edge layer of IHSs. For instance, IHSs that are members of such an edge layer may be configured for use of a nested set of adaptive allow lists, where one of the adaptive allow list specifies networked resources that are authorized for use by IHSs that are members of the edge layer. For instance, the adaptive allow list corresponding to such an edge layer may specify the local network address of the game controller and display monitor that are available for shared use within a household. Permanent members of the household may be granted non-expiring access to a these resources, while guests of the household may be provided with temporary access to these resources through adaptive allow list entries that expire after a specified duration.

As described, adaptive allow lists may also support transfer of ongoing software sessions, such as video game play, between members of an edge layer. For instance, an individual playing a video game may wish to transfer the ongoing gameplay to another individual. Embodiments may support such transfers through the use of adaptive allow lists. For instance, in a scenario where the gameplay session being transferred is being supported by a networked gaming console, a URL corresponding to the gameplay session may be posted to an adaptive allow list by the transferring game player. Based on configuration of the IHS of the individual receiving the transferred game play to operating using this adaptive allow list, the IHS of the receiving user is authorized to access the URL and to resume the gameplay session specified by the URL. In this manner, adaptive allow lists may be utilized to transfer various types of software sessions between IHSs, such as within members of a co-located edge layer of IHSs. In addition, embodiments may support certain restrictions on such capabilities for sharing of resources through adaptive allow lists. For example, sharing of certain resources may be restricted to or from certain geographic regions. For instance, sharing of a video game title, game controller or a video game service may be restricted in certain geographic regions. In such instances, embodiments may restrict the resources that are sharable via an adaptive allow list, such as based on the location of the edge layer of co-located IHSs. Embodiments may thus reject requests to share such restricted resources through an adaptive allow list.

In support of capabilities for use of adaptive allow list in granting temporary network resource authorizations, embodiments may implement a local cache on the IHS of operative adaptive allow lists. Each time an adaptive allow list is retrieved from its stored network location, a copy of the adaptive allow list may be added to the local cache, along with expiration information associated with the retrieved adaptive allow list. In such embodiments, at 340, upon identifying an entry in an adaptive allow list that is an address of a nested adaptive allow list, the local cache of the IHS may be evaluated in order to identify any expired entries. For instance, any entries in the local cache that include a TTL value, or other form of expiration, that has expired will result in removal of those entries from the cache, thus revoking authorization for the IHS to access the network resources in the invalidated adaptive allow list. Embodiments may additionally or alternatively evaluate the local cache in this manner at various intervals or in response to various events, such as in response to detecting a request for access to a network resource.

With the local cache updated to include only non-expired entries, at 345, embodiments inspect the local cache for a copy of the nested adaptive allow list. At 350, embodiments determine whether the nested adaptive allow list is already present in the local cache. If the local cache does not include a copy of the adaptive allow list, at 355, the network location (e.g., a URL, IP address, etc.) specified by the link to the nested adaptive allow list is used to retrieve the adaptive allow list, along with any expiration restrictions for this adaptive allow list. Once retrieved, the nested adaptive allow list is added to the local cache, along with any expiration restrictions. In scenarios where a non-expired copy of the nested adaptive allow list is present in the local cache, at 360, that adaptive allow list is loaded from the cache. As illustrated, at 325, embodiments return to processing of each of the entries in the nested adaptive allow list that is loaded from the cache in order to identify the specify network resources that are authorized for use by that adaptive allow list.

In this manner, embodiments may traverse a tiered set of adaptive allow lists in order to generate a listing of all network resources that are allowed for use by the IHS. Once all of the entries of adaptive allow lists have been iterated, at 375, embodiments determine there are no more entries for processing. Accordingly, at 385, embodiments may configure network interfaces of the IHS to communications that are restricted to network resources specified in the processed adaptive allow lists. As described above, network controllers such as a NIC or Bluetooth controller may be configured with a listing of allowed network addresses such that attempts to request access to any other network addresses are rejected by the network controllers. In scenarios where adaptive allow lists include expirations, the evaluation of the cache for expired entries thus also includes removing expired network resource address information that is maintained by these network controllers.

In scenarios what a request for access to a network resource is pending, at 390, that request is evaluated based on the processed adaptive allow list, and any nested adaptive allow lists that are identified and processed. In scenarios where the requested network resource is approved based on the adaptive allow lists, the user may issue requests to the authorized network addresses until expiration, if any, of the adaptive allow lists that authorize the addresses. In scenarios where the request for a network resource is denied, the user may be provided with a notification of the denial. Upon request by the user, embodiments may provide the user with a listing of the adaptive allow lists that are currently being enforced by the IHS, thus providing the user with information that is usable by an administrator to identify an adaptive allow list through which expanded network resource permissions may be granted to this user.

Through the selection of the adaptive allow list used to grant the additional authorizations, an administrator may provide such expanded network resource permissions to any number of IHSs. For instance, a large number of IHSs managed by an organization, such as an educational institution, may operate using a base adaptive allow list that specifies core resources for use by all of these IHSs, such as by all student users of these IHSs. In such instances, this base adaptive allow list may also include a link to another adaptive allow list that is specific to each grade level in the institution. Through a modification of such a grade-specific adaptive allow list, an administrator may quickly grant all students at this grade level with expanded network resource permissions. In this same manner, each grade level adaptive allow list may include a link to another class-specific adaptive allow list. Through modifications to these class-specific adaptive allow list, an administrator can quickly grant smaller groups with more specific authorizations that may be more temporary in nature, such as granting the students taking a robotics class with temporary access to a robotics programming web service. By aligning the expiration of this class-specific adaptive allow list with the end date of this class, an administrator ensures that use of the robotics programming web service remains within the school's seat license restrictions for use of the service.

In addition to being used to grant users with additional network resource permissions, embodiments may also include capabilities allowing administrators to quickly revoke or fully enable network resource permission for all IHSs within an organization. For instance, in emergency scenarios, it may be preferable to allow users with access to any network resources, even if still subject to the restrictions of other security protocols that remain in place. Embodiments may thus provide administrators with an option for populating all base adaptive allow lists that are used within the organization's IHSs with a wildcard entry that signifies that all network resources are allowed via all of the network interfaces of the IHS.

Conversely, in other emergency scenarios, it may instead be preferable to temporarily restrict all access to network resources by all IHSs, such as to prevent any reduction in available bandwidth to individuals responding to the emergency. As such, embodiments may provide administrators with a capability for flushing all adaptive allow lists in use by the organization, while also generating a backup or a checkpoint that allows the administrator to later return to the flushed adaptive allow list configuration. Upon an administrator issuing such as command, subsequent requests for access to network resources by any IHS in the organization are rejected due to the base adaptive allow list being flushed (i.e., empty). Through these capabilities, embodiments provide support for a kill switch by which administrators can quickly terminate network access to all IHS users within an organization.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) restricted to communications with a plurality of allowed network resources, the IHS comprising:
   one or more processors;
   a memory device coupled to the one or more processors, the memory device storing computer-readable instructions that, upon execution by the one or more processors, cause the IHS to:
   detect a request for access to a network resource;
   identify a factory-provisioned network address that is stored by the IHS and that specifies a location of an adaptive allow list comprising a listing of the allowed network resources to which the IHS is restricted;
   load the adaptive allow list from the factory-provisioned network address; and
   reject the request for access to the network resource when the network resource is not in the listing of allowed network resources from the adaptive allow list;
   wherein the adaptive allow list further comprises a link to an additional adaptive allow list comprising a listing of additional allowed network resources to which the IHS is restricted.

2. The IHS of claim 1, wherein the factory-provisioned network address specifying the location of the adaptive allow list is provided by a customer for which the IHS is being factory-provisioned.

3. The IHS of claim 2, wherein modifications to the adaptive allow list by the customer modify the allowed network resources to which the IHS is restricted.

4. The IHS of claim 1, wherein execution of the instructions by the one or more processors further causes the IHS to: determine whether the additional adaptive allow list is stored in a local cache of the IHS, wherein the local cache stores one or more adaptive allow lists.

5. The IHS of claim 4, wherein execution of the instructions by the one or more processors further causes the IHS to: remove an expired adaptive allow list from the local cache of the IHS, wherein the removal of the expired adaptive allow list results in rejection of request to access network resources listed in the expired adaptive allowed list.

6. The IHS of claim 1, wherein the allowed network resources from the adaptive allowed list comprise a set of Internet domains to which the IHS is restricted.

7. The IHS of claim 1, wherein the additional allowed network resources from the additional adaptive allowed list comprises a network address of a peripheral device.

8. The IHS of claim 7, wherein the peripheral device comprises a multimedia device.

9. The IHS of claim 8, wherein expiration of the additional adaptive allowed list restricts further access to the multimedia device by the IHS.

10. The IHS of claim 1, wherein execution of the instructions by the one or more processors further causes the IHS to: reject all requests for access to network resources in response to determining the adaptive allow list is empty.

11. The IHS of claim 10, wherein the adaptive allow list is emptied based on a command from an administrator configuring access to network resources by the IHS.

12. The IHS of claim 3, wherein modifications to the adaptive allow list by the customer modify the allowed network resources to which a group of IHS are restricted, where each IHS in the group is factory-provisioned with the network address of the adaptive allow list.

13. A method for restricting communications of an Information Handling System (IHS) to a plurality of allowed network resources, the method comprising:

detecting a request for access to a network resource;

identifying a factory-provisioned network address that is stored by the IHS and that specifies a location of an adaptive allow list comprising a listing of the allowed network resources to which the IHS is restricted;

loading the adaptive allow list from the factory-provisioned network address; and rejecting the request for access to the network resource when the network resource is not in the listing of allowed network resources from the adaptive allow list;

wherein the adaptive allow list further comprises a link to an additional adaptive allow list comprising a listing of additional allowed network resources to which the IHS is restricted.

14. The method of claim 13, wherein the factory-provisioned network address specifying the location of the adaptive allow list is provided by a customer for which the IHS is being factory-provisioned.

15. The method of claim 14, wherein modifications to the adaptive allow list by the customer modify the allowed network resources to which the IHS is restricted.

16. A computer-readable storage device having instructions stored thereon for restricting communications of an Information Handling System (IHS) to a plurality of allowed network resources, wherein execution of the instructions by one or more processors of the IHS causes the one or more processors to:

detect a request for access to a network resource;

identify a factory-provisioned network address that is stored by the IHS and that specifies a location of an adaptive allow list comprising a listing of the allowed network resources to which the IHS is restricted;

load the adaptive allow list from the factory-provisioned network address; and reject the request for access to the network resource when the network resource is not in the listing of allowed network resources from the adaptive allow list;

wherein the adaptive allow list further comprises a link to an additional adaptive allow list comprising a listing of additional allowed network resources to which the IHS is restricted.

17. The computer-readable storage device of claim 16, wherein the factory-provisioned network address specifying the location of the adaptive allow list is provided by a customer for which the IHS is being factory-provisioned, and wherein modifications to the adaptive allow list by the customer modify the allowed network resources to which the IHS is restricted.

* * * * *